United States Patent
Maekawa et al.

(10) Patent No.: US 7,403,868 B2
(45) Date of Patent: Jul. 22, 2008

(54) APPARATUS FOR DETECTING OR PREDICTING TOOL BREAKAGE

(75) Inventors: Susumu Maekawa, Yamanashi (JP); Kuniharu Yasugi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 581 days.

(21) Appl. No.: 10/661,572

(22) Filed: Sep. 15, 2003

(65) Prior Publication Data

US 2004/0068394 A1    Apr. 8, 2004

(30) Foreign Application Priority Data

Oct. 8, 2002    (JP)    ............... 2002-295401

(51) Int. Cl.
G06F 11/30    (2006.01)
(52) U.S. Cl. ........................ 702/182; 702/34
(58) Field of Classification Search ........... 702/182, 702/183, 184, 34, 35; 700/96, 159, 169, 700/180
See application file for complete search history.

(56) References Cited

U.S. PATENT DOCUMENTS

| 5,780,725 | A | 7/1998 | Tanaka |
| 5,857,166 | A | 1/1999 | Kim |
| 6,463,352 | B1 * | 10/2002 | Tadokoro et al. ............ 700/169 |
| 2003/0163286 | A1 * | 8/2003 | Yasugi ....................... 702/185 |

FOREIGN PATENT DOCUMENTS

| EP | 1 166 960 A2 | 1/2002 |
| EP | 1 342 534 A2 | 9/2003 |
| JP | 52-095386 | 8/1977 |
| JP | 58-126042 | 7/1983 |
| JP | 59-107843 | 6/1984 |
| JP | 61-252052 | 11/1986 |
| JP | 02-256448 | 10/1990 |
| JP | 05-116056 | 5/1993 |
| JP | 5-305554 | 11/1993 |
| JP | 6-155244 | 6/1994 |
| JP | 6-201398 | 7/1994 |
| JP | 07-186010 | 7/1995 |
| JP | 9-1444 | 1/1997 |
| JP | 09-085585 | 3/1997 |
| JP | 2000-107987 | 4/2000 |
| JP | 2000-263378 | 9/2000 |

OTHER PUBLICATIONS

Interrogation dated Aug. 10, 2006 regarding Japanese Patent Application No. 2002-295401.
Notice of Grounds for Rejection (Office Action) dated Nov. 1, 2004 and English translation.

* cited by examiner

*Primary Examiner*—Bryan Bui
*Assistant Examiner*—Jonathan Moffat
(74) *Attorney, Agent, or Firm*—Staas & Halsey LLP

(57) ABSTRACT

If a tool breakage occurs, a cutting time T and a maximum value (absolute value) G of a slope of a drop in a cutting load become small. A cutting load integrated value S increases as a tool wears and becomes small when the breakage occurs. Therefore, these values T, G, and S are obtained in a machining cycle, moving variable thresholds are obtained (updated) based on values T, G, and S obtained in a preceding machining cycle, and the thresholds and the values T, G, and S obtained in the current machining cycle are compared with each other to thereby determine an abnormal condition of the tool.

23 Claims, 8 Drawing Sheets (a)

(b)

(c)

(d)

(e)

(a)          (b)

APPARATUS FOR DETECTING OR PREDICTING TOOL BREAKAGE

BACKGROUND OF THE INVENTION

1. Field of the Invention

The present invention relates to detection or prediction of a breakage of a tool used for machining workpieces made of the same material into the same shapes or for continuously machining the large number of workpieces such as parts of the same specifications.

2. Description of the Related Art

In general, a cutting edge of a tool used in a machine tool wears and cutting resistance increases with a passage of time in which the tool is used for machining. As the wear advances, machining accuracy deteriorates and predetermined machining accuracy required of a workpiece cannot be maintained. Then, the tool reaches an end of its life.

By the way, as an apparatus for detecting abnormal condition of a tool which reaches an end of its life due to automatic machining for many hours, it is proposed that an upper-limit permissible value P3 and a lower-limit permissible value P4 are obtained for a reference waveform P2 and that a deviation of load variation with time during one machining cycle from this permissible range is monitored as shown in FIG. 1. The reference waveform P2 is obtained directly from load data P1 during one machining cycle of one workpiece, by subjecting the load data P1 to processing of moving averages, or from average values of load data of a plurality of workpieces.

For example, there is known art in which a load during model machining is sampled at intervals of a predetermined time and stored as reference load values and load variation permissible values are stored, load values during continuous machining are detected, the reference load value and the detected load value at detection times corresponding to each other are compared with each other, and a warning is outputted if the detected load value exceeds the permissible value (see Japanese Patent Application Laid-open No. 52-95386).

There is also a known apparatus which detects abnormal condition of a tool and in which load variations associated with rotational motion and load variations associated with feeding motion during normal cutting are respectively stored as normative signals, load variations detected during continuous cutting and the normative signals are compared with each other along a passage of time, and a warning is outputted if a load variation deviating from a preset permissible range continues for a predetermined time period (see Japanese Patent Application Laid-open No. 58-126042). In this apparatus, according to whether the warning is caused by an abnormal load in the rotational motion or by an abnormal load in the feeding motion, a machine is stopped immediately or after completing the cutting.

Furthermore, there is also a known method of detecting abnormal condition of a machine and in which vibration values, temperatures, current values, and the like are measured during an operation step and stored as reference values in a time series, detected values in a succeeding operation cycle and the reference values are respectively compared with each other in the time series, and a warning is given when a difference between them deviates from set upper and lower limit values (see Japanese Patent Application Laid-open No. 6-201398).

In the above-described prior art, the load waveform data detected in a time series during continuous operation and the reference waveform data are compared with each other. However, there is also known art in which not the entire waveform data but characteristic points of the waveform data are extracted and compared with each other to detect abnormal condition. For example, there is a known invention in which, in a special-purpose machine or a numerically controlled machine for machining the large number of certain parts, an average waveform of load waveforms during a plurality of cuttings is obtained, permissible ranges of timings (time elapsed from a start of machining) of crests and troughs of the average waveform are set, and abnormal condition of the tool and timing of replacement of the tool can be predicted based on whether crests and troughs of a load waveform pattern during normal machining are in the set permissible range, whether a load value in a set section of the load waveform pattern does not exceed set upper and lower limits, whether an integrated value of the load values in the set section of the load waveform pattern does not exceed set upper and lower limits, whether a machining time from a start of machining does not exceed a set permissible time, and the like (see Japanese Patent Application Laid-open No. 59-107843).

Recent cutting is fast, a rotational speed and a feed speed of the tool are high, and a cycle time is short. In such machining, in order to keep track of a load condition of a cutting tool during machining, a load needs to be sampled at short sampling intervals of about several milliseconds or less to subject these several loads to processing of moving averages and the like so as to eliminate variations in data due to noise signals of a motor and a bearing of a main shaft. Therefore, reference waveform data stored as reference values gets a high density and requires a large storage capacity and it is difficult to perform real-time comparison processing when the tool is in abnormal condition.

Furthermore, even if the same machine, work material, tool, and cutting fluid are used, a torque load detected from a main shaft motor and a thrust load detected from a feed shaft motor change according to changes in a rotational speed of a main shaft and/or a feed speed of a feed shaft, when cutting conditions are changed. Therefore, it is difficult in practice to uniformly set proper thresholds for judging tool breakage torque and/or thrust load in advance. For this reason, in practice, the tool breakage torque and/or thrust load value is set as occasion arises and normally before carrying out actual machining by reference to values based on experiences of the past of operators or measurement values obtained in test machining. This operation is extremely complicated. Moreover, curves of the above-mentioned torque load detected from the main shaft motor and thrust load detected from the feed shaft motor change in respects of a load absolute value at an early stage and a manner in which the load increases at a midway stage simply because the workpiece (material to be worked) or the tool is replaced with a workpiece or a tool of the same specifications.

This manner is shown schematically with torque/thrust load progression curves in FIGS. 2(a) and 2(b). A horizontal axis in FIG. 2(a) indicates the number of times the tool has been used and a vertical axis indicates the torque load detected from the main shaft motor or the thrust load detected from the feed shaft motor. A curve C1 shows a progression of an average value of torque/thrust when work materials a1 are cut by a tool b1 into the same machined shapes. A curve C2 shows a progression of an average value of torque/thrust when work materials a2 (of the same specifications as the work material a1) are cut by a tool b2 (of the same specifications as the tool b1) into the same machined shapes. Marks x indicate points where the tools got broken.

Graphs (i), (ii), (iii), and (iv) in FIG. 2(b) each shows detected loads in a machining cycle at a portion marked with a circle in FIG. 2 (*a*) and shown with an arrow. A horizontal shaft t indicates time and a vertical axis indicates the load (torque/thrust).

As shown in FIG. 2 (*a*), the curves C1 and C2 are different from each other in the average value of the loads in a machining cycle, the average values of the loads in machining cycles at an early stage, and an upward slope of the average value of the loads in machining cycles at a midway stage. Furthermore, as shown in FIG. 2(*b*), since the tool started to be used and as the number of times the tool is used increases, a load pattern in one machining cycle changes. Therefore, if the tool breakage torque and/or thrust value(s) to be set as a threshold which is a criterion for detecting/predicting the tool breakage is set at the start, the breakage cannot be predicted or the tool may be judged to be in abnormal condition when it is not in some cases.

Moreover, there are some cases in which a load varies during machining, depending on an object to be machined. For example, in drilling or tapping, a waveform variation in one machining cycle is large in special drilling or tapping such as machining of an underfill hole, leaving a space not to be cut at some midpoint in the machining, as shown in FIG. 3(*a*), machining of intersecting holes as shown in FIG. 3(*b*), machining of successive holes as shown in FIG. 3(*c*), machining of a through hole for machining a hole in a position where a hole has already been formed in a workpiece formed by using a mold as shown in FIG. 3(*d*), and machining of a hole in a workpiece formed of laminating materials of different properties as shown in FIG. 3(*e*). In this case, if a threshold for detecting abnormal condition is obtained based on an average value of loads in one machining cycle, it is difficult to detect an abnormal condition and the like of the tool.

SUMMARY OF THE INVENTION

According to the present invention, a breakage or prediction of a breakage of a tool is detected in an apparatus for detecting the breakage or the prediction of the breakage of the tool used in a machine tool, by providing: cutting load detecting means for detecting a cutting load; means for obtaining at least one of three cutting load data by the cutting load detecting means, including a cutting time, an area of a cutting load waveform during cutting, and a maximum value (absolute value) of a slope of a drop in a cutting load during the cutting, in a machining cycle, as a load state value in a current machining cycle; means for updating and obtaining a moving variable threshold based on a load state value calculated in a machining cycle before the current machining cycle before the current machining cycle; and means for comparing the load state value in the current machining cycle with the moving variable threshold to determine an abnormal condition of the tool. The load state value based on which the moving variable threshold is obtained is a load state value obtained in a machining cycle immediately or a plurality of cycles before the current machining cycle or an average of load state values in respective machining cycles in all machining cycles from a first machining cycle to the machining cycle immediately before the current machining cycle or in a plurality of machining cycles before the current machining cycle.

If the invention is applied to a case of continuously machining workpieces such as parts of the same specifications, the means for updating and obtaining the moving variable threshold updates and obtains the moving variable threshold based on the load state value calculated in a machining cycle for a preceding workpiece at a machining position corresponding to a machining position in the current machining cycle. In this case, the machining cycle in which the moving variable threshold is obtained is a machining cycle for a workpiece immediately before a current workpiece or machining cycles for a plurality of workpieces before a current workpiece at a machining position corresponding to the current machining position. The moving variable threshold may be obtained based on the average of the load state values of all workpiece from the first machined workpiece through the workpiece machined immediately before the current workpiece, or a plurality of workpieces machined before the current workpiece.

The moving variable threshold is obtained by multiplying the obtained load state value by a predetermined coefficient or by adding a predetermined value to the load state value. The apparatus further includes means for providing an instruction to activate an audible alarm and/or a warning light or means for providing an instruction to replace the tool or to stop operation of the machine when the means for determining an abnormal condition of the tool determines that the tool is in an abnormal condition. The means for determining an abnormal condition of the tool determines that the tool is in an abnormal condition, if the load state value in the current machining cycle exceeds the moving variable threshold or becomes smaller than the moving variable threshold. With regard to the area of the cutting load waveform and the maximum value (absolute value) of the slope of the drop in the cutting load, a first moving variable threshold and a second moving variable threshold smaller than the first moving variable threshold are obtained, and it is judged that the tool is in an abnormal condition, if the load state value in the current machining cycle exceeds the first moving variable threshold or if the load state value in the current machining cycle becomes smaller than the second moving variable threshold.

The means for detecting the cutting load detects a load of a feed shaft or a main shaft to which the cutting load is applied by an observer or by a driving current of a motor for driving a feed shaft or a motor for driving a main shaft to which the cutting load is applied.

BRIEF DESCRIPTION OF THE DRAWINGS

The above and other objects and features of the present invention will become apparent from the following description of the embodiment by reference to the accompanied drawings.

DESCRIPTION OF THE EMBODIMENT

FIGS. 5 to 8 show measurement values of a load (thrust load) in a direction of a tool feed shaft (Z axis) in a machining cycle in which a drill of a tool got broken and a plurality of machining cycles before the cycle, in case where drilling by using the drill was carried out. In these drawings, a reference horizontal axis indicates a position where a machining load at the time when a main shaft is idling is zero and a black dot indicates a position where load data is obtained. In this example, measurement data are obtained at intervals of 8 milliseconds. In the following description, a cutting time of drilling is referred to as a value T, an area (an integrated value of a load value) of a cutting load waveform during cutting is referred to as a value S, and a maximum value (an absolute value) of a slope of a drop in the cutting load is referred to as a value G. The value G is obtained from a difference between measured loads at measurement intervals of 8 milliseconds during the cutting.

Figure 5:
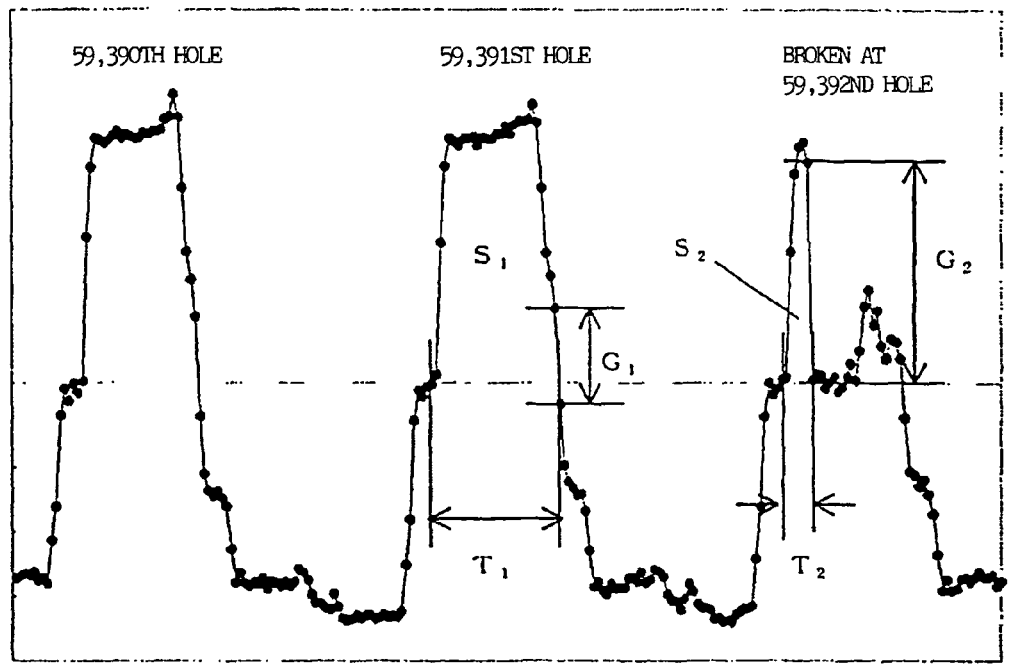
FIG. 5 is a graph showing measurement results obtained by measuring cutting loads in a machining cycle in which a tool breakage occurs and two machining cycles before the cycle in machining by using a carbide drill.

FIG. 5 shows a waveform of the thrust loads of the feed shaft (Z axis) in respective machining cycles when a carbide drill of a diameter of 2.5 mm was used and drilling at a main shaft rotational speed S of 8000/min and a feed speed F of 3200 mm/min are carried out repeatedly on workpieces of steel S50C. In this example, a tool breakage occurred during a 59,392nd drilling.

According to FIG. 5, a cutting time of drilling in a drilling cycle in which the tool breakage occurred is shown as T2, an area of a cutting load waveform during cutting is shown as S2, and a maximum value (an absolute value) of a slope of a drop in the cutting load is shown as G2. A cutting time of a drilling cycle immediately before a cycle in which the tool breakage occurred is shown as T1, an area of a cutting load waveform during the cutting is shown as S1, and a maximum value (absolute value) of a slope of a drop in the cutting load is shown as G1. There are the following relationships between T1, S1, G1 and T2, S2, G2.

T1>T2, S1>S2, G1<G2

Therefore, by comparing values T, S, and G of a machining cycle with values T, S, and G of a machining cycle immediately before the cycle, a tool breakage can be detected.

Because no large changes occur in the values T, S, and G until the machining cycle immediately before the drilling cycle in which the tool breakage occurs, the tool breakage can be detected by comparing values T, S, and G in a current drilling cycle with (1) values T, S, and G in a machining cycle which is a predetermined number of cycles before the current cycle, (2) average values of values T, S, and G in a first machining cycle and a plurality of succeeding machining cycles, or (3) average values of values T, S, and G in the current machining cycle and a plurality of machining cycles before the current cycle.

Figure 6:
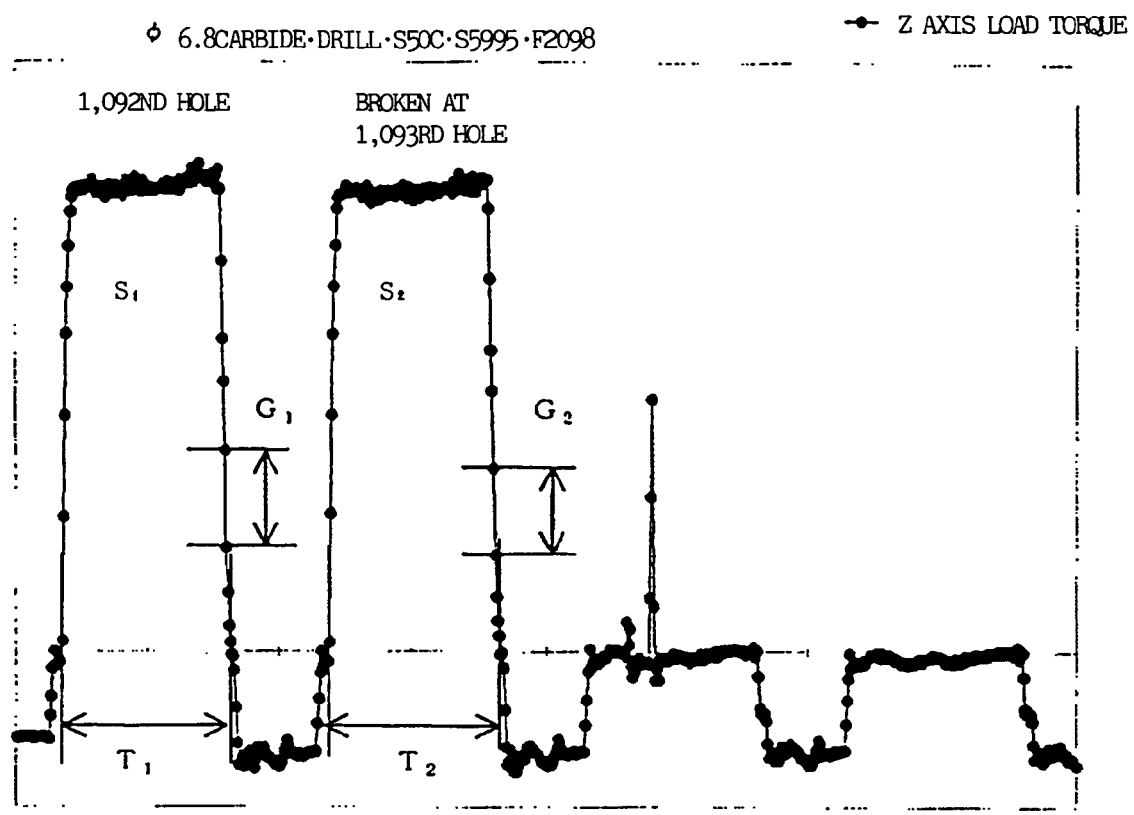
FIG. 6 is a graph showing measurement results of another experiment and obtained by measuring cutting loads in a machining cycle in which a tool breakage is detected and two machining cycles before the cycle in machining by using a carbide drill.

FIG. 6 shows a waveform of a thrust load on the feed shaft (Z axis) when a tool breakage occurred during a return by a rapid traverse in a reverse direction after drilling proceeded to a bottom of a hole and cutting feed was completed. In this example, the tool was a carbide drill of a diameter of 6.8 mm, a workpiece was a steel of S50C, a main shaft rotational speed S was 5995/min, and a feed speed F was 2098 mm/min. In this example, as the tool breakage occurred during the return by the rapid traverse after 1,093rd drilling was completed, no special differences appear between a cutting time T2 of drilling, an area S2 of a cutting load waveform during the cutting, a maximum value (absolute value) G2 of a slope of a drop in a cutting load in a drilling cycle in which the tool breakage occurred and a cutting time T1 of drilling, an area S1 of a cutting load waveform during cutting, a maximum value (absolute value) G1 of a slope of a drop in a cutting load in a drilling cycle immediately before the cycle and therefore the tool breakage cannot be detected. However, because values T, S, and G in a next drilling cycle change by large amounts from the values T, S, and G in the drilling cycles before the cycle, the tool breakage can be detected based on it.

Figure 7:
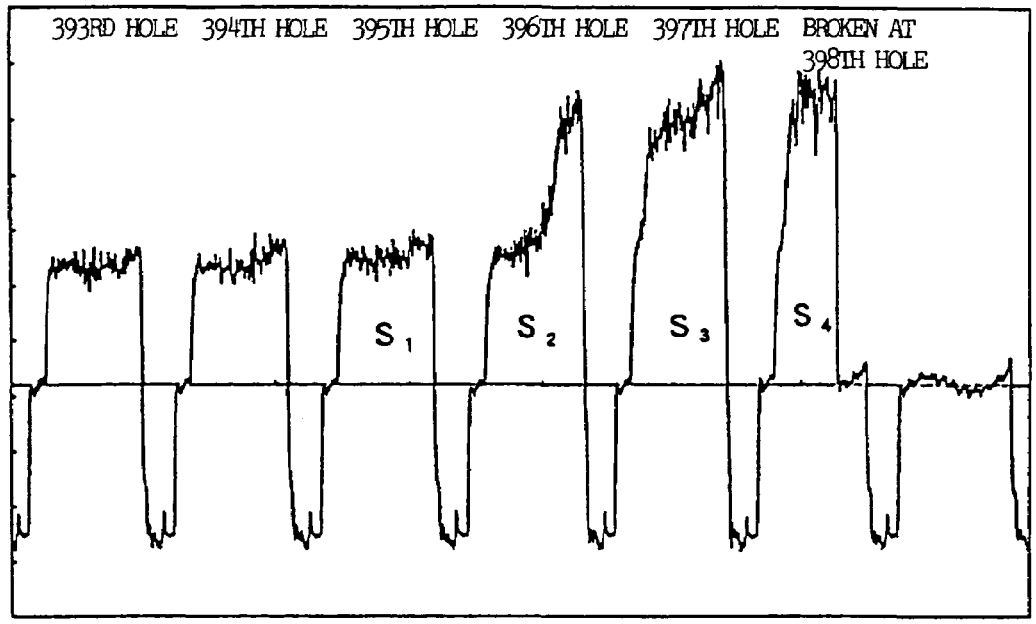
FIG. 7 is a graph showing measurement results obtained by measuring cutting loads in a machining cycle in which a tool breakage is detected and a plurality of machining cycles before the cycle in machining by using a high-speed-steel drill.

FIG. 7 shows a waveform of a thrust load on a feed shaft (Z axis) in respective machining cycles when drilling was carried out under the condition that the tool used was a high-speed-steel-drill of a diameter of 3.3 mm, workpieces was a steel S50C, a main shaft rotational speed S was 2,895/min and a feed speed F was 666 mm/min. In this example, a tool breakage occurred during cutting of a 398th hole. In this case, the tool breakage can be detected based on a fact that an area S4 of a cutting load waveform in a 398th drilling cycle in which the tool breakage occurred is smaller than an area S3 of a cutting load waveform in a (397th) drilling cycle immediately before the cycle.

Moreover, the breakage of the tool due to wear can be predicted based on a fact that the area S of the cutting load waveform is increasing (S1<S2<S3) through a (393rd) drilling cycle three cycles before the cycle in which the tool breakage occurred and succeeding drilling cycles.

The tool breakage can also be detected based on a fact that the cutting time T in the drilling cycle in which the tool breakage occurred is shorter than the cutting time in the drilling cycle immediately before the cycle.

Figure 8:
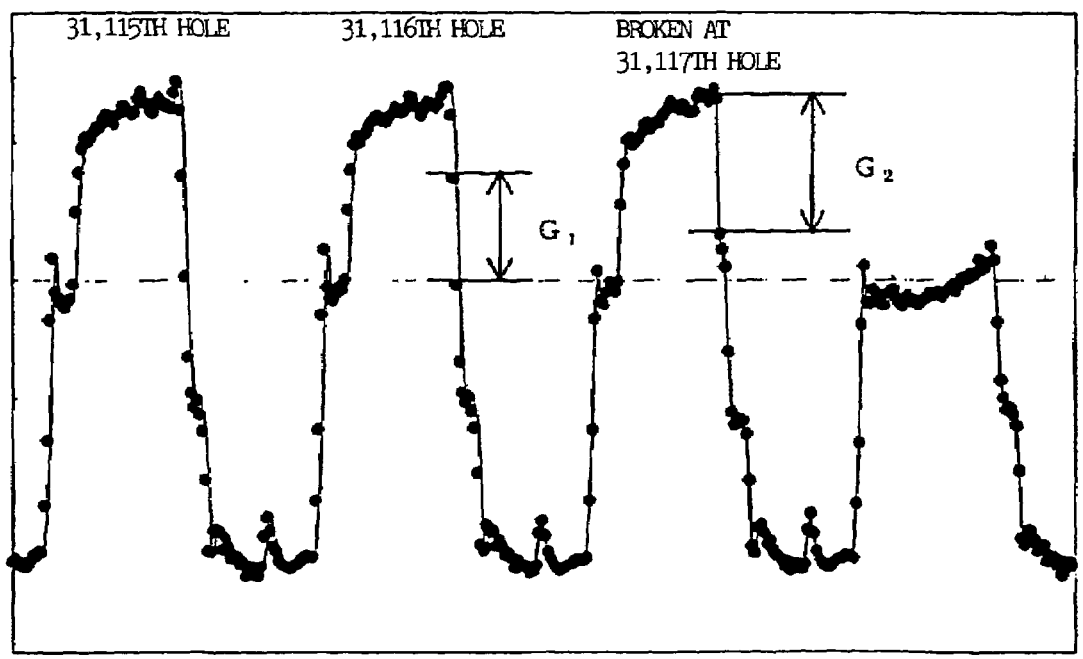
FIG. 8 is a graph showing measurement results of still another experiment, obtained by measuring cutting loads in a machining cycle in which a tool breakage is detected and two machining cycles before the cycle, in machining by using a carbide drill.

FIG. 8 shows a waveform of a thrust load on a feed shaft (Z axis) in respective machining cycles when drilling was carried out under the condition that a tool used was a carbide drill of a diameter of 2.5 mm, workpiece was a steel S50C, a main shaft rotational speed S was 7,898/min and a feed speed F was 3,159 mm/min.

In this example, a tool breakage occurred during cutting of a 31117th hole. There was only a difference of about 1.2 times between a maximum value (absolute value) G2 of a slope of a drop in the cutting load in a drilling cycle in which the tool breakage occurred and a maximum value (absolute value) G1 of a slope of a drop in the cutting load in a drilling cycle immediately before the cycle.

Fifty cutting experiments each ended up with a tool breakage were conducted. In most of them, as shown in FIG. 5, a maximum value (absolute value) G2 of a slope of a drop in a cutting load in a machining cycle in which the tool breakage occurred is 5 to 6 times a maximum value (absolute value) G1 of a slope of a drop in a cutting load in a machining cycle immediately before the cycle. However, almost no change can be seen in some cases as shown in FIG. 6 and only a difference of about 1.2 times can be seen in some cases as shown in FIG. 8. However, if the tool gets broken, a value G in a machining cycle after the breakage becomes extremely smaller than a value G in the machining cycle in which the tool is broken.

From experimental results in FIGS. 5 to 8, the tool breakage can be detected based on a fact that a value T (cutting time) in a machining cycle in which the tool breakage occurs becomes smaller than a value T in a (normal) machining cycle before the cycle. Furthermore, based on a fact that a value S (an area of a cutting load waveform during cutting, or an integrated value of a load value) gradually increases through a plurality of machining cycles up to a machining cycle in which a tool breakage occurs, the tool breakage can be predicted at a stage where the tool breakage has not occurred yet and when the value S is increasing. Moreover, based on a fact that a value G (a maximum value (absolute value) of a slope of a drop in a cutting load) in a machining cycle becomes larger than a value G in a machining cycle before the cycle, an occurrence of a tool breakage in the current machining cycle can be detected. Furthermore, based on a fact that, when a tool gets broken, a value G (a maximum value (absolute value) of a slope of a drop in a cutting load) in a machining cycle after the breakage becomes extremely smaller than a value G in a machining cycle before the cycle (i.e., a machining cycle in which the breakage occurs), an occurrence of a tool breakage can be detected.

Therefore, in the present embodiment, in order to detect and predict a tool breakage in machining workpieces such as parts of the same specifications into the same machined shapes, a value T, S, or G in one machining cycle is obtained and is compared with a threshold. The threshold is obtained by obtaining a value T, S, or G in a normal machining cycle and multiplying the obtained value by a coefficient.

Figure 4:
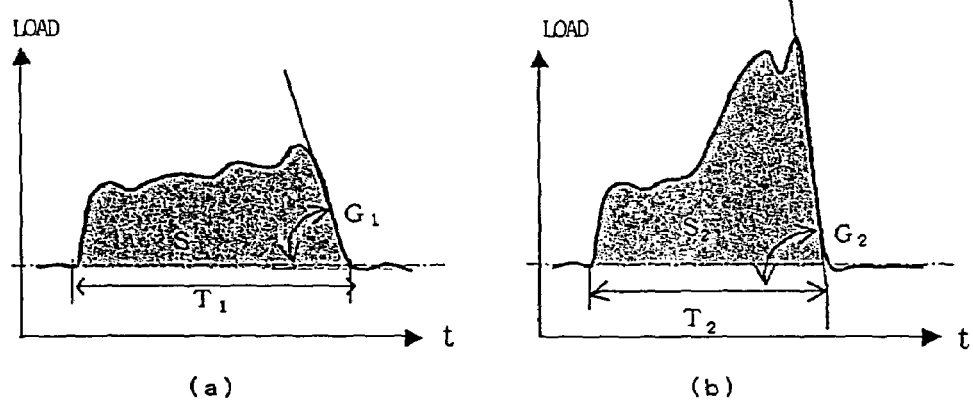
FIGS. 4 (*a*) and 4(*b*) are explanatory views for explaining a load state in one machining cycle in normal condition and a load state in one machining cycle in abnormal condition of a tool.

When a machining cycle showing a cutting load waveform shown in FIG. 4($b$) is carried out after a machining cycle showing a cutting load waveform shown in FIG. 4($a$), if any of following criteria is met, it is assumed that a tool got broken in the machining cycle in FIG. 4($b$).

First criterion: $T2 < c1 \cdot T1$
Second criterion: $S2 > c2 \cdot S1$ or $S2 < c3 \cdot S1$
Third criterion: $G2 > c4 \cdot G1$ or $G2 < c5 \cdot G1$, where T2, S2, and G2 are values T, S, and G in FIG. 4($b$) and T1, S1, and G1 are values T, S, and G in FIG. 4($a$). c1, c2, c3, c4, and c5 are coefficients and $0 < c1 < 1$, $c2 > 1$, $0 < c3 < 1$, $c4 > 1$, and $0 < c5 < 1$.

Figure 9:
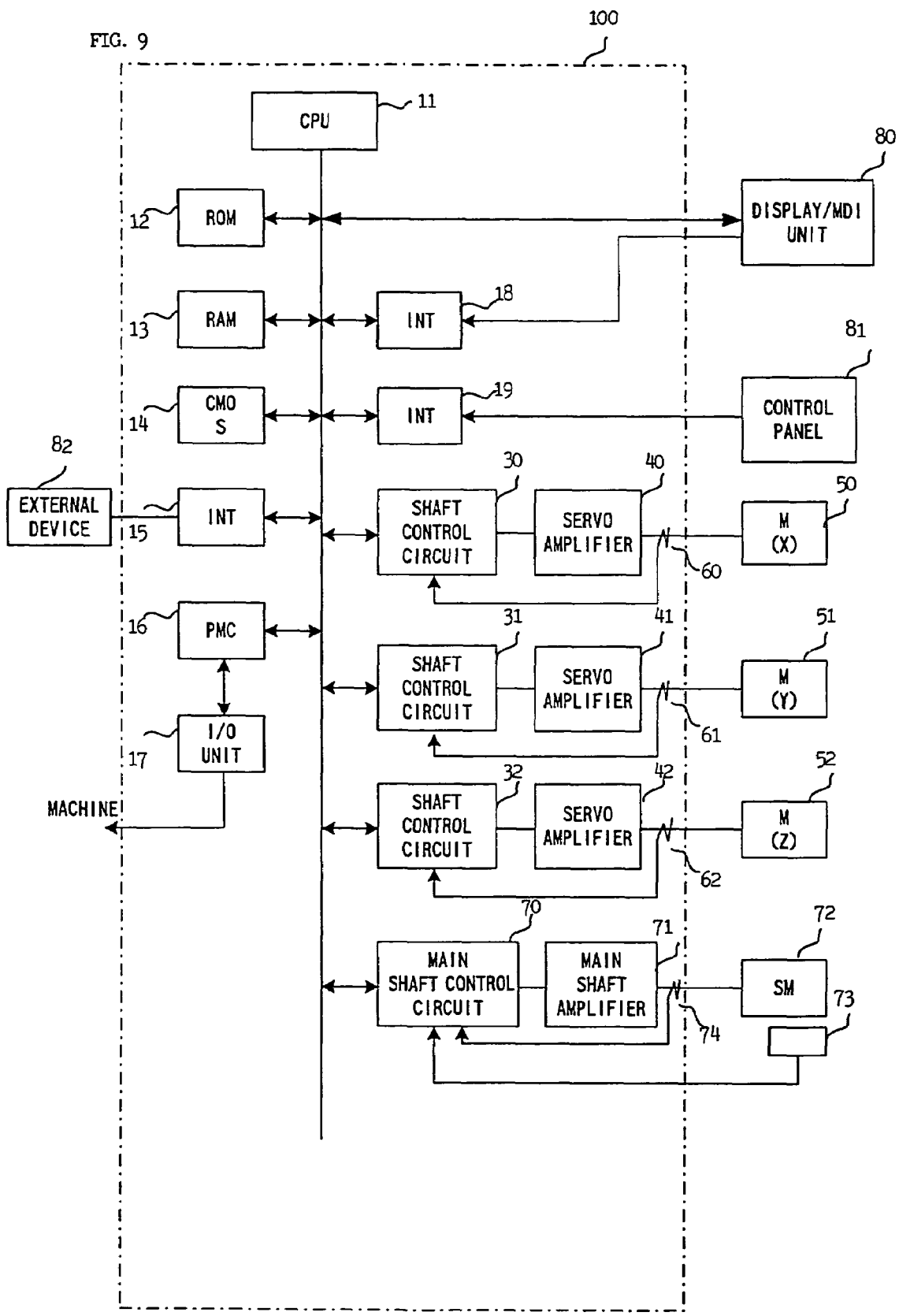
FIG. 9 is a block diagram of essential portions of a controller forming an embodiment of the invention and for carrying out control of a machine tool.

FIG. 9 is a block diagram of a controller (numerical control device) 100 for controlling a machine tool, which has functions to detect a tool breakage and predict a tool breakage. A CPU 11 is a processor for reading a system program stored in ROM 12 through a bus 20 and controlling the entire controller 100 according to the system program. In RAM 13, temporary computation data, display data, and various data inputted through a display/MDI unit 80 by an operator are stored. CMOS memory 14 is formed as non-volatile memory which is backed up by a battery (not shown) and in which memory states are maintained even after powering off of the controller 100. In the CMOS memory 14, machining programs read in through an interface 15 and machining programs inputted through the display/MDI unit 80 are stored. In the ROM 12, various system programs for executing processing of an edit mode required for writing and editing a machining program and processing for automatic operation are written in advance. Processing programs which are especially related to the invention, which detect a tool breakage or prediction of the tool breakage, and which will be described later are stored in the ROM 12.

The interface 15 allows connection between the controller 100 and an external device 82 such as an adaptor. From the external device 82 side, a machining program and the like are read. The machining program edited in the controller 100 can be stored in external storage means (not shown) through the external device 82. A programmable controller 16 outputs signals to an auxiliary apparatus (e.g., a robot hand for replacing a tool) of the machine tool through an I/O unit 17 to control the auxiliary apparatus by using a sequence program stored in the controller 100.

The display/MDI unit 80 is a manual data inputting device having a display, a keyboard, and the like. An interface 18 receives commands and data from the keyboard of the display/MDI unit 80 and passes them to the CPU 11. A control panel 81 disposed in a main body of the machine tool is connected to an interface 19. The control panel 81 is provided with a warning device and a warning light and is further provided with various switches for inputting various commands for the machine.

Shaft control circuits 30 to 32 for respective shafts receive movement commands for the respective shafts from the CPU 11 and output the commands for the respective shafts to servo amplifiers 40 to 42. The servo amplifiers 40 to 42 receive the commands and drive servomotors 50 to 52 for X, Y, and Z axiss. The servomotors 50 to 52 for the respective shafts include position/speed detectors. Position and speed signals from the position/speed detectors are fed back to the shaft control circuits 30 to 32 to perform feedback control of positions and speeds. Driving currents outputted from the servo amplifiers 40 to 42 to the respective servomotors 50 to 52 are detected in the same way as in the case of prior art by current detectors 60 to 62 and are respectively fed back to the shaft control circuits 30 to 32 to execute current (torque) control. As the driving currents passing through the motors is substantially equivalent to the load torque applied to the motors, load detecting means is formed of the current detectors 60 to 62 for detecting the driving currents passing through the servomotors 50 to 52 in the present embodiment. In FIG. 9, illustration of feedback of positions and speeds is omitted.

A main shaft control circuit 70 receives a main shaft rotation command and performs speed control based on a command speed and a feedback signal from a position coder 73 for generating feedback pulses in synchronization with rotation of a main shaft motor 72. The circuit 70 receives a current feedback signal from a current detector 74 for detecting the driving current passing through the main shaft motor 72 and performs current loop control to control a rotational speed of the main shaft motor 72. As a load and a driving current applied to the main shaft motor are substantially proportional to each other, means for detecting the load applied to the main shaft motor is formed of the current detector 74 in the embodiment.

In the embodiment, a drill is mounted as a tool to the main shaft, a large number of workpieces such as parts of the same specifications are successively subjected to drilling, and a breakage or prediction of the breakage of the drill is detected. In this case, the drill as the tool is mounted to the main shaft and the workpiece is mounted to a table driven by the servomotors 50 and 51 of the X and Y axes as the feed shafts. By the servomotor 52 of the Z axis as the feed shaft for moving the main shaft in a direction of the Z axis orthogonal to the X and Y axes, the drill as the tool moves with respect to the workpiece.

Figure 10:
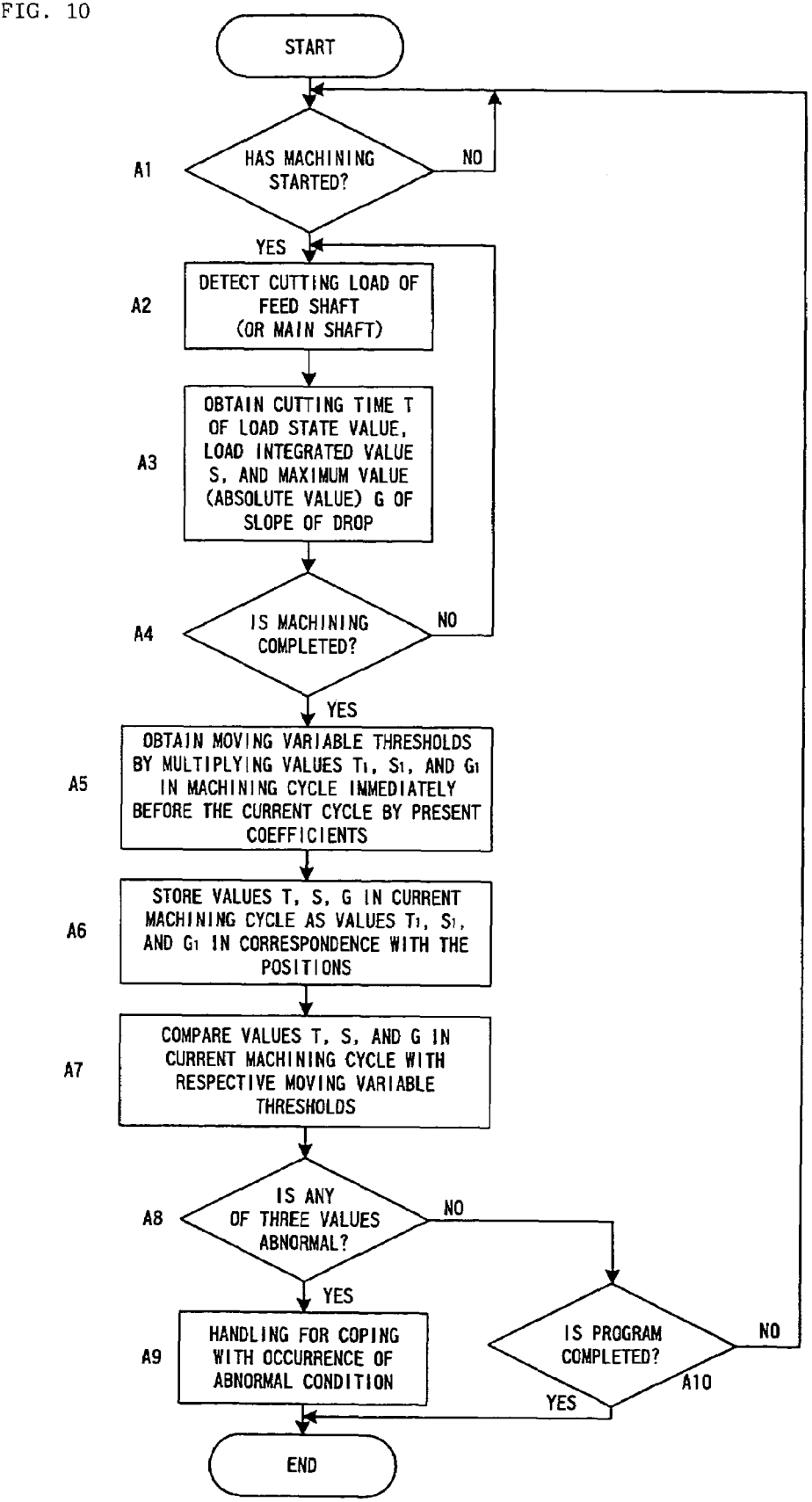
FIG. 10 is a flow chart of operational processing of the embodiment of the invention.

FIG. 10 is a flow chart of the processing program for detection or prediction of the breakage of the tool, stored in the ROM 12 of the controller 100.

If the CPU 11 judges that machining has started (step A1), a load applied to the servomotor 52 of the cutting feed shaft (Z axis) of the drill is detected by the current detector 62 every predetermined period (step A2). Instead of detecting the load applied to the servomotor 52 of the Z axis, a load applied to the main shaft motor 72 may be detected by the current detector 74.

Until completion of cutting is detected, a cutting load is detected every predetermined period. Furthermore, a cutting time T is obtained from the number of times the cutting load has been detected. By adding the cutting loads detected in the predetermined period, an integrated value S of the cutting load is obtained. If the load value detected in the current cycle is smaller than the load value detected in the preceding cycle (or if the cutting load is dropping), an absolute value of a difference between these load values is compared with a currently-stored maximum value (absolute value) G of a slope of a drop in a cutting load and a larger value is stored as a maximum value (absolute value) G of a slope of a drop in a cutting load (as it is or after it is updated). A stored initial value of G is zero.

As a result, when one machining cycle is completed, the cutting time T indicating the load state value, the cutting load integrated value S, and the maximum value (absolute value) G of the slope of the drop in the cutting load are obtained (steps A3 and A4).

Next, a cutting time T1, a cutting load integrated value S1, and a maximum value (absolute value) G1 of a slope of a drop in a cutting load in the machining cycle immediately before the current machining cycle (these are stored at step A6 in the preceding machining cycle in correspondence with a machining end position) are respectively multiplied by preset coefficients $c_1$, $c_2$, $c_3$, $c_4$, and $c_5$ to obtain moving variable thresholds $c_1 \cdot T_1$, $c_2 \cdot S_1$, $c_3 \cdot S_1$, $c_4 \cdot G_1$, and $c_5 \cdot G_1$ (step A5).

Then, the cutting time T, the cutting load integrated value S, and the maximum value (absolute value) G of the slope of the drop in the cutting load detected in the current machining cycle (step A3) are stored as T1, S1, and G1 in correspondence with a current machining position for use in machining a next workpiece (step A6).

Then, the cutting time T, the cutting load integrated value S, and the maximum value (absolute value) G of the slope of the drop in the cutting load obtained in the current machining: cycle (step A3) and the moving variable thresholds $c_1 \cdot T_1$, $c_2 \cdot S_1$, $c_3 \cdot S_1$, $c_4 \cdot G_1$, and $c_5 \cdot G_1$ obtained at step A5 are compared with each other and whether comparison results meet the above first, second, and third criteria is judged (steps A7 and A8).

As a result of this judgment, if it is judged that any of the cutting time T, the cutting load integrated value S, and the maximum value (absolute value) G of the slope of the drop in the cutting load is abnormal based on the first to third criteria, a warning is outputted by the warning device, the warning light, or the like disposed on the control panel 81 or handling for coping with occurrence of an abnormal condition is carried out by stopping operation of the machine, outputting a tool replacement command to a tool replacing device (not shown) to replace the tool, and the like (step A9).

On the other hand, if an abnormal condition of the tool has not been detected, whether the program is completed is judged (step A10). If it is not completed, the program moves to step Al where processing for detecting or predicting a tool breakage in the next machining is performed. If the program has been completed, processing on a present workpiece is completed.

Up to this point, the processing for detecting or predicting the tool breakage in the embodiment of the invention has been described. In the above-described embodiment, if it is detected that any one of the three load state values (the cutting time T, the cutting load integrated value S, and the maximum value (absolute value) G of the slope of the drop in the cutting load) is abnormal, it is judged that the tool is in an abnormal condition and the handling for coping with occurrence of an abnormal condition is carried out. However, it is also possible to detect an abnormal condition of a tool by using any one of these values T, S, and G.

For example, in case of determining an abnormal condition of a tool by using the cutting time T, it is judged that the tool breakage has occurred and the handling for coping with occurrence of an abnormal condition is carried out (step A9) when the cutting time T in the current machining cycle is smaller than the moving variable threshold $c_1 \cdot T_1$ as described above.

In case of determining an abnormal condition of a tool by using the cutting load integrated value S, it is detected that the tool is approaching the end of its life (breakage prediction) and the handling for coping with occurrence of an abnormal condition of the tool is carried out when the value S obtained in the current machining cycle becomes larger than the moving variable threshold $c_2 \cdot S_1$, or it is judged that the tool breakage has occurred and the handling for coping with occurrence of an abnormal condition of the tool is carried out when the cutting load integrated value S obtained in the current machining cycle becomes smaller than the second moving variable threshold $c_3 \cdot S_1$.

Furthermore, in case of determining as abnormal condition of a tool by using the maximum value (absolute value) G of the slope of the drop in the cutting load, it is judged that the tool has got broken during the current machining cycle and the handling for coping with occurrence of an abnormal condition of the tool is carried out when the value G obtained in the current machining cycle becomes larger than the first moving variable threshold ($c_4 \cdot G_1$). When the value G obtained in the current machining cycle becomes smaller than the second moving variable threshold ($c_5 \cdot G_1$), it is judged that the tool breakage has occurred already and the handling for coping with occurrence of an abnormal condition of the tool is carried out.

Although the cutting load is detected by using the driving current which is the load applied to the servomotor 52 for the feed shaft (Z axis) of the tool (drill) in the above-described embodiment, it is also possible to detect the cutting load by detecting the driving current of the main shaft motor 72 for the main shaft for rotating the tool (drill) as described above. It is also possible to detect the loads applied to the servomotor 52 for the feed shaft and the main shaft motor 72 from the driving currents of the respective motors and to put these loads together to use them as the cutting load for processing at and after step A5.

It is also possible, by obtaining the loads applied to the feed shaft and the main shaft respectively and by performing the processing at and after the step A5 respectively for the feed shaft and the main shaft, to proceed to step A9 when abnormality is detected in the cutting time T, the cutting load integrated value S, or the maximum value (absolute value) G of the slope of the drop in the cutting load for the feed shaft or the main shaft, or to proceed to step A9, judging that that tool is in an abnormal condition, when abnormality is detected in both the feed shaft and the main shaft.

Figure 1:
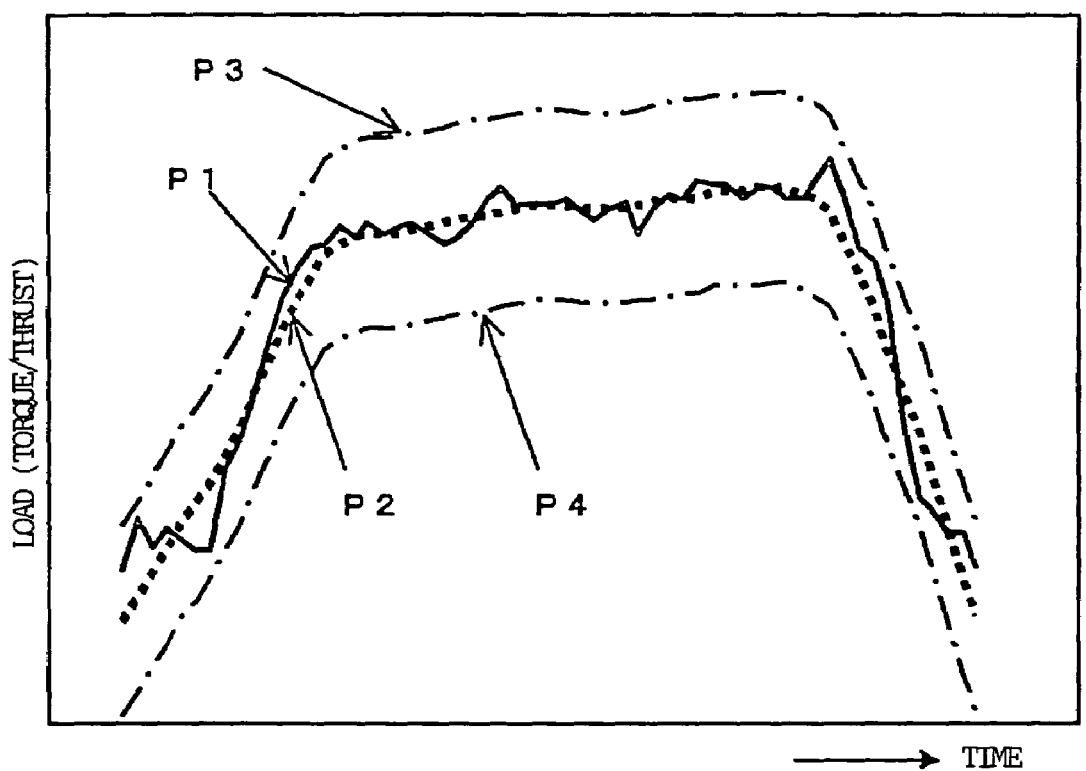
FIG. 1 is an explanatory view of a prior-art method for detecting and judging abnormal condition of a tool.
Figure 2:
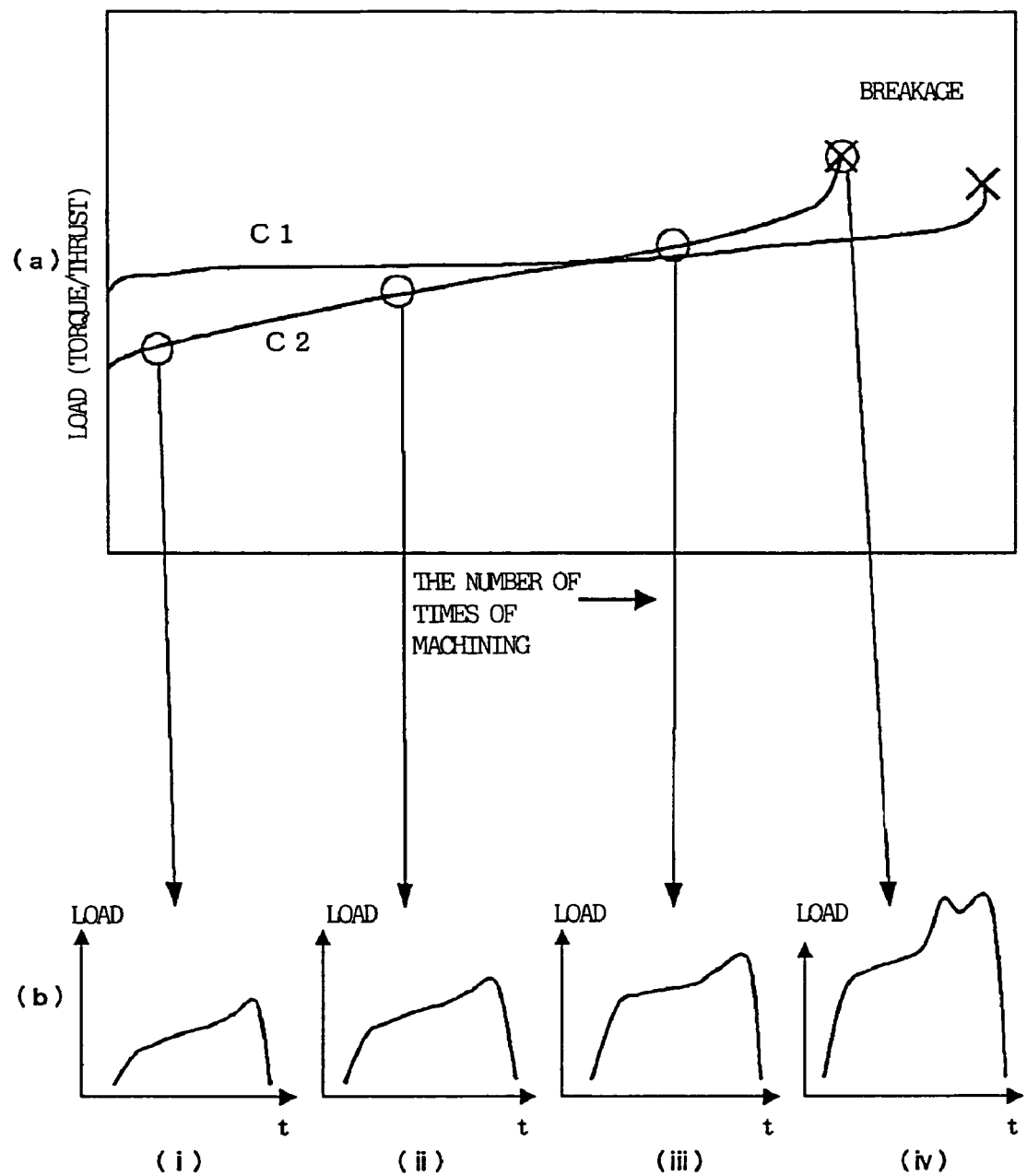
FIGS. 2(*a*) and 2 (*b*) are explanatory views for explaining state of load applied to a tool.
Figure 3:
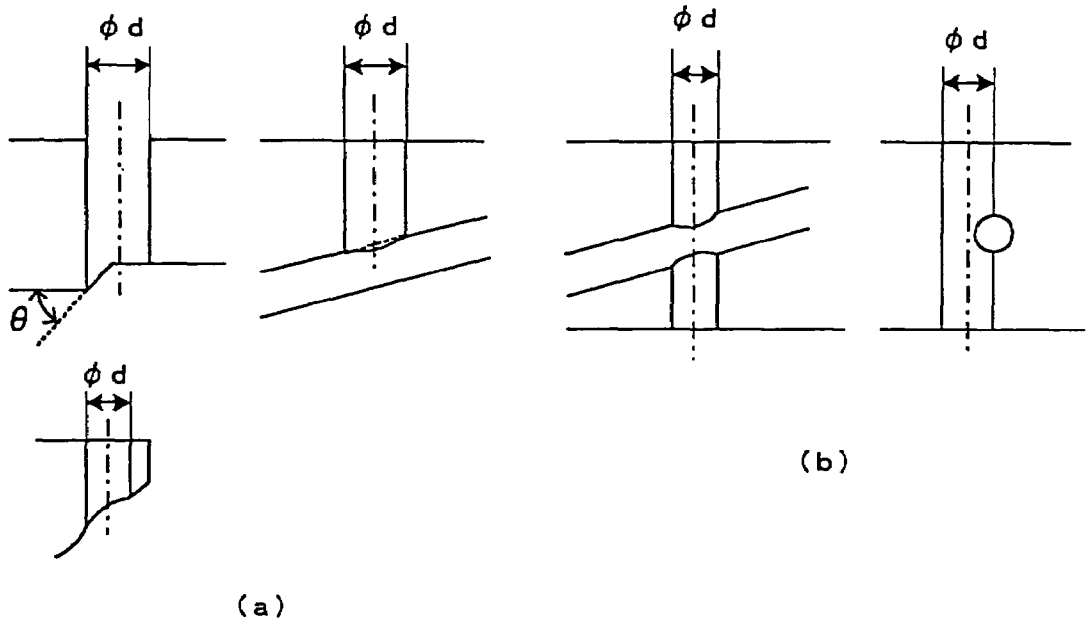
FIGS. 3(*a*) to 3(*e*) are explanatory views for explaining various machining states in drilling.
Figure 3:
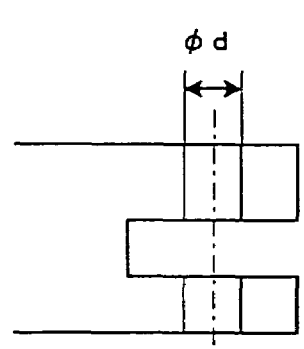
Figure 3:
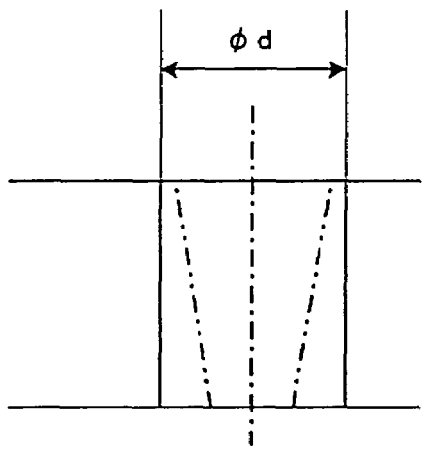
Figure 3:
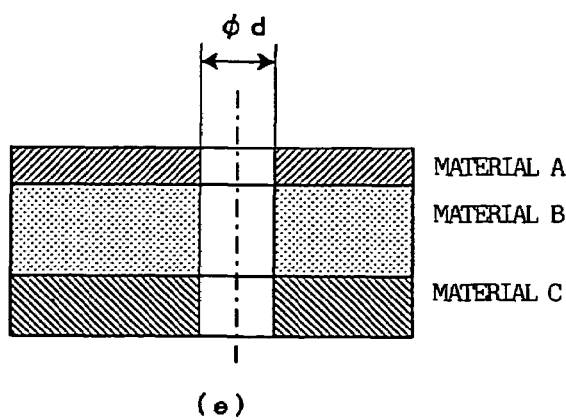

In the above-described embodiment, the cutting times T, the cutting load integrated values S, and the maximum values (absolute values) G of the slopes of the drops in the cutting loads are stored in correspondence with the machining positions at steps A5 and A6 and are used. In case of machining only one portion in a workpiece, the machining position need not be specified for the workpiece, accordingly it is sufficient only that the cutting time T, the cutting load integrated value S, and the maximum value (absolute value) G of the slope of the drop in the cutting load are stored. However, in general, the values T, S, G are stored in correspondence with the machining positions, since a form of drilling by using a drill varies and the cutting load changes accordingly, depending on the machining position as shown in FIG. 3 when carrying out a plurality of machining on a workpiece by the present drill, for example.

If workpieces are of flat and uniform materials and are machined into the large number of similar shapes under similar cutting conditions, abnormal condition is judged based merely on moving variable thresholds obtained based on a cutting time T, a cutting load integrated value S, and a maximum value (absolute value) G of a slope of a drop in a cutting load in a preceding machining cycle and a cutting time T, a cutting load integrated value S, and a maximum value (absolute value) G of a slope of a drop in a cutting load in a current machining cycle. In other words, the values T, S, and G are stored at step A6 and data stored in the preceding machining cycle is read and the moving variable thresholds are obtained by using the data at step A5.

As described above, in the embodiment, the thresholds for the judgment of an abnormal condition are changed based on data obtained in the immediately preceding and similar machining. However, as already described above, instead of using the cutting time T, the cutting load integrated value S, and the maximum value (absolute value) G of the slope of the drop in the cutting load in the immediately preceding machining cycle, it is possible to obtain the moving variable threshold by using a cutting time T, a cutting load integrated value S, and a maximum value (absolute value) G of a slope of a drop in a cutting load in a machining cycle a plurality of cycles before a current cycle, or by using average values of cutting times T, cutting load integrated values S, and maximum values (absolute values) G of slopes of drops in cutting loads in a plurality of machining cycles before the current machining cycle or in machining cycles from the beginning.

Although the moving variable thresholds are obtained by multiplying the cutting time, the cutting load integrated value, and the maximum absolute value of the slope of the drop in the cutting load by the coefficients in the above-described embodiment, it is also possible to obtain the moving variable thresholds by adding or subtracting predetermined values to or from the above values T, G or S, instead of multiplying by the coefficients.

Furthermore, although the cutting load is detected by detecting the driving currents of the main shaft and the feed shaft in the above-described embodiment, the cutting load may be obtained by an already-known load estimating observer. In other words, the observer for estimating the load may be installed in the main shaft control circuit or the shaft control circuit of the feed shaft to which the cutting load is applied and the load obtained by the observer is detected as the cutting load at step A2. Other processing is similar to operational processing shown in FIG. 10. It is also possible to detect the cutting load by detecting electric power of the main shaft and the motor of the cutting feed shaft. Moreover, a sensor such as a dynamometer for measuring cutting resistance may be used for detecting the cutting resistance.

In the invention, in the detection of the tool breakage or prediction of the tool breakage, the number of data of the thresholds to be stored as the criteria is small, only a small storage capacity is required, and it is possible to adapt to high-speed processing associated with high-speed machining because the number of the data is small. Because the moving variable thresholds which are successively updated based on a machining cycle before a current machining cycle are employed as thresholds, it is possible to accurately detect or predict the tool breakage even if condition of the tool changes due to use of the tool for many hours.

The invention claimed is:

1. An apparatus for detecting or predicting a breakage of a tool used in a machine tool, the apparatus comprising:
cutting load detecting means for detecting a cutting load;
means for obtaining at least one of three cutting load data by said cutting load detecting means, including a cutting time, an area of a cutting load waveform during cutting, and a maximum absolute value of a slope of a drop in a cutting load during the cutting, in a machining cycle, as a load state value in a current machining cycle;
means for updating and obtaining a moving variable threshold based on the load state value calculated in a machining cycle before the current machining cycle; and
means for comparing the load state value in the current machining cycle with the moving variable threshold to determine an abnormal condition of the tool.

2. The apparatus for detecting or predicting a breakage of a tool according to claim 1, wherein the machining cycle before the current cycle is the machining cycle immediately before or a plurality of cycles before the current machining cycle.

3. The apparatus for detecting or predicting a breakage of a tool according to claim 1, wherein the moving variable threshold is obtained based on an average value of load state values of respective machining cycles and calculated in all machining cycles from a first machining cycle to a machining cycle immediately before the current machining cycle or in a plurality of machining cycles before the current machining cycle.

4. The apparatus for detecting or predicting a breakage of a tool according to claim 1, wherein the moving variable threshold is obtained by multiplying the obtained load state value by a predetermined coefficient.

5. The apparatus for detecting or predicting a breakage of a tool according to claim 1, wherein the moving variable threshold is obtained by adding a predetermined value to the obtained load state value.

6. The apparatus for detecting or predicting a breakage of a tool according to claim 1, further comprising means for providing an instruction to activate an audible alarm and/or a warning light or means for providing an instruction to replace the tool or to stop operation of the machine when the means for determining an abnormal condition of the tool determines that the tool is in an abnormal condition.

7. The apparatus for detecting or predicting a breakage of a tool according to claim 1, wherein the means for determining an abnormal condition of the tool determines that the tool is in an abnormal condition when the load state value in the current machining cycle exceeds the moving variable threshold.

8. The apparatus for detecting or predicting a breakage of a tool according to claim 1, wherein the means for determining an abnormal condition of the tool determines that the tool is in an abnormal condition when the load state value in the current machining cycle becomes smaller than the moving variable threshold.

9. The apparatus for detecting or predicting a breakage of a tool according to claim 1, wherein the means for determining an abnormal condition of the tool obtains a first moving variable threshold and a second moving variable threshold smaller than the first moving variable threshold for the area of the cutting load waveform and the maximum absolute value of the slope of the drop in the cutting load and determines that the tool is in an abnormal condition when the load state value in the current machining cycle exceeds the first moving variable threshold or when the load state value in the current machining cycle becomes smaller than the second moving variable threshold.

10. The apparatus for detecting or predicting a breakage of a tool according to claim 1, wherein the cutting load detecting means detects a load of a feed shaft or a main shaft to which the cutting load is applied.

11. The apparatus for detecting or predicting a breakage of a tool according to claim 1, wherein the cutting load detecting means detects the load by an observer for estimating an applied load or by a driving current of a motor for driving a feed shaft or a motor for driving a main shaft to which the cutting load is applied.

12. An apparatus for detecting or predicting a breakage of a tool used in a machine tool, the apparatus comprising:
   cutting load detecting means for detecting a cutting load;
   means for obtaining at least one of three cutting load data by said cutting load detecting means, including a cutting time, an area of a cutting load waveform during cutting, and a maximum absolute value of a slope of a drop in a cutting load during the cutting, in a machining cycle, as a load state value in a current machining cycle;
   means for updating and obtaining a moving variable threshold based on the load state value calculated in a machining cycle for a preceding workpiece at the machining position which corresponds to the machining position in the current machining cycle; and
   means for comparing the load state value in the current machining cycle with the moving variable threshold to determine an abnormal condition of the tool.

13. The apparatus for detecting or predicting a breakage of a tool according to claim 12, wherein the preceding workpiece is the workpiece immediately before or a plurality of cycles before the current machining cycle.

14. The apparatus for detecting or predicting a breakage of a tool according to claim 12, wherein the moving variable threshold is obtained based on an average value of load state values in machining cycles at the corresponding machining positions, calculated for all workpieces from a workpiece machined first to a workpiece machined in an immediately preceding cycle or in a plurality of workpieces machined before.

15. The apparatus for detecting or predicting a breakage of a tool according to claim 12, wherein the moving variable threshold is obtained by multiplying the obtained load state value by a predetermined coefficient.

16. The apparatus for detecting or predicting a breakage of a tool according to claim 12, wherein the moving variable threshold is obtained by adding a predetermined value to the obtained load state value.

17. The apparatus for detecting or predicting a breakage of a tool according to claim 12, further comprising means for providing an instruction to activate an audible alarm and/or a warning light or means for providing an instruction to replace the tool or to stop operation of the machine when the means for determining an abnormal condition of the tool determines that the tool is in an abnormal condition.

18. The apparatus for detecting or predicting a breakage of a tool according to claim 12, wherein the means for determining an abnormal condition of the tool determines that the tool is in an abnormal condition when the load state value in the current machining cycle exceeds the moving variable threshold.

19. The apparatus for detecting or predicting a breakage of a tool according to claim 12, wherein the means for determining an abnormal condition of the tool determines that the tool is in an abnormal condition when the load state value in the current machining cycle becomes smaller than the moving variable threshold.

20. The apparatus for detecting or predicting a breakage of a tool according to claim 12, wherein the means for determining an abnormal condition of the tool obtains a first moving variable threshold and a second moving variable threshold smaller than the first moving variable threshold for the area of the cutting load waveform and the maximum absolute value of the slope of the drop in the cutting load and determines that the tool is in an abnormal condition when the load state value in the current machining cycle exceeds the first moving variable threshold or when the load state value in the current machining cycle becomes smaller than the second moving variable threshold.

21. The apparatus for detecting or predicting a breakage of a tool according to claim 12, wherein the cutting load detecting means detects a load of a feed shaft or a main shaft to which the cutting load is applied.

22. The apparatus for detecting or predicting a breakage of a tool according to claim 12, wherein the cutting load detecting means detects the load by an observer for estimating an applied load or by a driving current of a motor for driving a feed shaft or a motor for driving a main shaft to which the cutting load is applied.

23. A method to determine a condition of a tool used in a machine tool, comprising:
   obtaining a load state value during a current machining cycle;
   updating a moving variable threshold based on a prior load state value calculated in a machining cycle before the current machining cycle;
   comparing the load state value of the current machining cycle with the moving variable threshold, the load state value including at least one of a cutting time, an area of a cutting load waveform during cutting, and a maximum absolute value of a slope of a drop in a cutting load during the cutting; and
   determining a condition of the tool based on the result of the comparison and outputting the result of the determination.

* * * * *

UNITED STATES PATENT AND TRADEMARK OFFICE
CERTIFICATE OF CORRECTION

| | | |
|---|---|---|
| PATENT NO. | : 7,403,868 B2 | Page 1 of 1 |
| APPLICATION NO. | : 10/661572 | |
| DATED | : July 22, 2008 | |
| INVENTOR(S) | : Susumu Maekawa et al. | |

It is certified that error appears in the above-identified patent and that said Letters Patent is hereby corrected as shown below:

Column 2, Line 57, change "al" to --a1--.

Column 4, Line 52, change "4 (a)" to --4(a)--.

Column 8, Line 23, change "axiss." to --axes.--.

Column 14, Line 51, change "determing" to --determining--.

Signed and Sealed this

Sixteenth Day of December, 2008

JON W. DUDAS
*Director of the United States Patent and Trademark Office*